Nov. 13, 1945.  R. J. MILLER  2,388,794
MOTION PICTURE PROJECTOR
Filed June 17, 1942
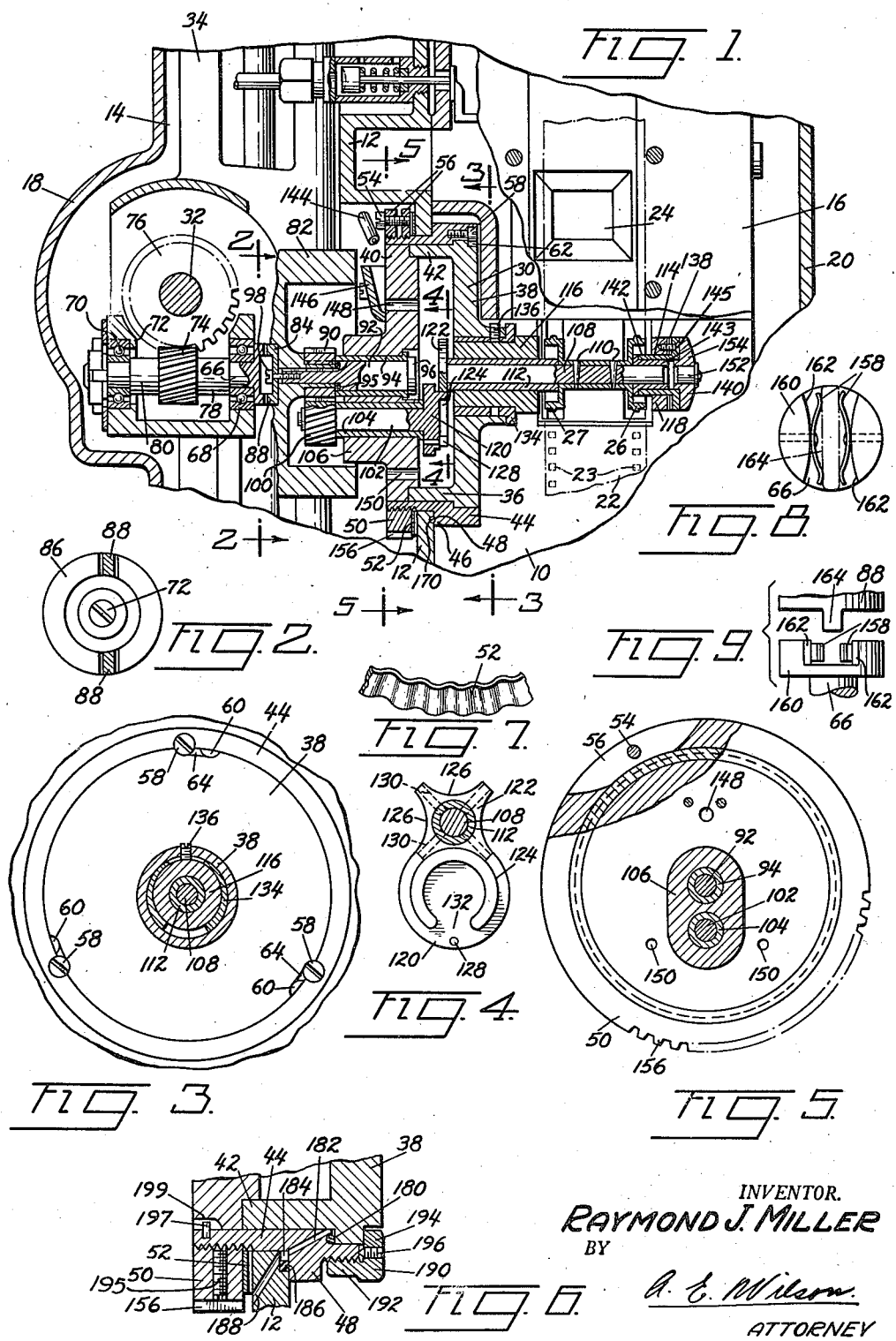
INVENTOR.
RAYMOND J. MILLER
BY
A. E. Wilson
ATTORNEY Patented Nov. 13, 1945

2,388,794

UNITED STATES PATENT OFFICE 2,388,794

MOTION PICTURE PROJECTOR

Raymond J. Miller, Detroit, Mich., assignor to American Pattern and Manufacturing Co., Detroit, Mich., a copartnership composed of said Miller and Alfred E. Wilson Application June 17, 1942, Serial No. 447,344

7 Claims. (Cl. 88—18.3)

This invention relates to motion picture projectors and more particularly to an intermittence drive mechanism for intermittently aligning successively spaced film frames with an aperture formed in an aperture plate whereby images may be projected from the film to a screen positioned at a distance from the projector whereby the images may be viewed.

Heretofore considerable difficulty has been experienced with intermittent drive means for motion picture projectors in that in order to service or repair the intermittence movement it was necessary to virtually dismantle the entire projector, and no means were provided to enable the intermittent drive mechanism to be replaced in the projector in such a manner that it would be in synchronization with the shutter operating means. Additional difficulties arose by reason of the fact that the parts of the intermittent drive mechanism would wear unevenly whereby frequent adjustments were necessary in order to provide a smooth operating and quiet intermittent film drive mechanism.

An object of this invention is to provide a unitary intermittent drive mechanism removable from and replaceable in the projector as a unit in such a manner that synchronization between the intermittence movement and the shutter driving mechanism is at all times maintained.

Another object of the invention resides in the provision of an improved intermittence drive mechanism having readily operable adjustment means to accurately align the spaced driving means.

A further object of the invention is to provide an intermittence driving mechanism which can be assembled in a motion picture projector in only one predetermined adjusted position whereby synchronization of the intermittence drive means with the shutter operating mechanism is insured.

A further object resides in the provision of a unitary self-contained intermittence movement having means whereby the movable parts of the mechanism are thoroughly lubricated at all times.

Yet a still further object is to provide an intermittence driving mechanism wherein a flywheel is interposed in the driving system and isolated therefrom by a vibration dampener to substantially damp vibrations and oscillations and prevent them from being exerted back on the gear train.

Still a further object is to provide vertically and laterally adjustable constant speed and intermittently driven shafts operably connected through a Geneva movement offset from the aligned shafts to provide a smooth operating compact film driving mechanism.

Another object resides in the provision of a novel intermittence movement housed within the rotatable casing mounted on resilient means for oscillation to effect a framing movement of the film relative to the projecting aperture.

Still a further object is to provide an intermittently driven mechanism wherein substantially the entire wear of the intermittent drive may be concentrated on relatively closely spaced members having vertically and axially movable adjusting means to compensate wear of the movable parts.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a fragmentary vertical sectional view through a motion picture projector embodying the present invention.

Fig. 2 is a sectional view taken substantially on the line 2—2 of Fig. 1, looking in the direction of the arrows.

Fig. 3 is a sectional view taken substantially on the line 3—3 of Fig. 1, looking in the direction of the arrows.

Fig. 4 is also a sectional view taken substantially on the line 4—4 of Fig. 1, looking in the direction of the arrows.

Fig. 5 is a sectional view taken substantially on the line 5—5 of Fig. 1, looking in the direction of the arrows.

Fig. 6 is a fragmentary vertical sectional view of a portion of the projector embodying a modified form of oil sealing mechanism.

Fig. 7 is a fragmentary perspective view of a corrugated spring member adapted for use in mounting the intermittence movement in the projector.

Fig. 8 is an end elevation of a driving member between a driving shaft and a flywheel of the intermittence movement.

Fig. 9 is a side elevation of the drive mechanism of Fig. 8.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now to the drawing, it will be observed that the invention is illustrated as embodied in a motion picture projector having a main casing 10 separated by an intermediate wall 12 into mechanism and film compartments 14 and 16 respectively. The mechanism compartment 14 is closed by a back cover plate 18 and the film compartment 16 may be closed by a hinged access door 20 to permit the operator to thread film 22 into the projector.

The film 22 may be propelled through the projector by film driving sprockets and an intermittently driven sprocket 26 to align successively spaced film frames with an aperture 24.

The film 22 is preferably a flexible strip of celluloid or other suitable material, and may be provided with apertures 23 formed adjacent its marginal edges to receive driving teeth 27 of a sprocket 26.

It has been found that best results are obtained from the sound equipment now conventionally used with motion picture projectors where the film is driven at a substantially uniform speed such that approximately 1440 successively spaced film frames are aligned with the aperture 24 per minute.

In the 35 mm. film now used in commercial projectors sixteen separate film frames are provided in a foot of film. To align 1440 frames of film with the aperture 24 per minute it is necessary that the film be driven at the rate of approximately one and one-half feet or twenty-four frames per second. To drive the film at this rate of speed the intermittence drive sprocket 26 must be actuated 1440 times per minute. The sprocket 26 preferably has sixteen driving teeth 27 to move four film frames each time the sprocket makes a complete revolution. It is necessary that the sprocket 26 be moved through a quarter of a revolution each time it is actuated to align the next succeeding film frame with the aperture 24. The sprocket 26 must therefore make six complete revolutions per second or it must be actuated through a complete cycle in $\frac{1}{24}$ of a second.

In view of the fact that an interval of time is required to actuate the sprocket 26 and move the film, the cycle of operation of the intermittently driven sprocket 26 must be further subdivided. Good results are obtained where this cycle of $\frac{1}{24}$ of a second has been divided into five substantially equally spaced time intervals of $\frac{1}{120}$ of a second each. One of these time intervals of $\frac{1}{120}$ of a second may be utilized to actuate the intermittence drive sprocket 26 to align the next succeeding film frame with the aperture 24 and the film frame may be maintained in alignment with the aperture 24 the remaining $\frac{4}{120}$ of a second of each interval of $\frac{1}{24}$ of a second to permit projecting light from a suitable light source to pass through the aperture 24 to project images from the film 22 onto the screen.

In view of the fact that the sprocket 26 and the film 22 must thus be started and stopped quickly many times per second, high inertia and load forces are built up whereby undesirable vibration is developed in the projector and the driving mechanism is subjected to wear.

The intermittently driven sprocket 26 may be actuated by means of an intermittence movement 30 preferably mounted as a unit in the intermediate wall 12. The intermittence movement may be driven from a shaft 32 journalled in a gear train carrier 34 as more clearly disclosed in my co-pending application Serial No. 447,252, filed June 16, 1942.

The intermittence movement 30 is positioned in a casing 36 having front and back walls 38 and 40 respectively separated by an axial flange or cylinder 42. The back wall 40 may be secured to the flange or cylinder 42 by means of a plurality of spaced screws projecting through the back wall 40 into the cylinder 42.

The casing 36 housing the intermittence movement may be removably positioned in a carrier formed of a cylinder 44 having a radially extending flange 46 adapted to engage the intermediate wall 12 preferably on the film compartment side. A seal 48 may be provided to seal the space between the flange 46 and the intermediate wall 12.

A ring 50 may be threaded on the carrier cylinder 44 from the mechanism compartment side. A spring 52 preferably of the corrugated type as illustrated in Fig. 7 may be interposed between the threaded ring 50 and the intermediate wall 12 to provide a self-compensating sliding fit between the ring and wall.

The ring 50 may be securely clamped to the cylinder 44 of the carrier in any adjusted position by means of a screw 54 clamping separated segments 56 of the ring 50 into clamping engagement with the threads of the cylinder 44 of the carrier.

The casing 36 may be releasably maintained in the cylinder 44 of the carrier by means of a plurality of spaced screws 58 threaded into the carrier cylinder 44. The front wall 38 is provided with spaced axially extending slots 60 to permit the casing 36 to be removed from the cylinder 44 of the carrier when it is oscillated therein to align the slots 60 with the heads of the screws 58. In the locked position illustrated in Figs. 1 and 3 the heads of the screws 58 lie within countersunk portions 62 formed in the front wall 38 of the casing 36. An undercut portion 64 may be provided between the slots 60 and the countersunk portions 62 to permit oscillation of the carrier 36 without completely removing the screws 58.

The intermittence movement may thus be readily removed from the projector from the film compartment side without removing the carrier 44 or disturbing the adjusted position of the ring 50 on the cylinder 46 clamping the carrier to the intermediate wall 12 of the projector.

The intermittence movement comprises a drive shaft 66 journalled in ball bearings 68 and 70 on opposite ends of the shaft 66. The gear train carrier 34 is provided with an inwardly directed flange 72 against which the bearing 70 abuts to maintain it in a predetermined axial position. The shaft 66 is provided with a gear 74 meshing with a gear 76 fixed to the shaft 32 in the gear train carrier 34. Spaced collars 78 and 80 are interposed between the gear 74 and the bearings 68 and 70 to maintain the assembly in a predetermined lateral spaced relation.

The driving shaft 66 is operably connected with a flywheel 82 through suitable driving means 84. The driving means 84 is preferably such that the flywheel 82 will be assembled in a predetermined angular relation relative to the driving shaft 66 when assembled therewith. The shaft 66 may as illustrated in Fig. 2 have spaced driving flanges 86 adapted to engage within cooperating slots in a member 88 secured to the flywheel 82 as by a press fit into the end thereof.

The flywheel 82 may be provided with a gear 90 located internally of the flywheel 82 and secured thereto and to a flywheel shaft 92 by a suitable key locking all three members together.

The flywheel shaft 92 may be rotatably mounted in the back wall 40 of the intermittence casing 36. The shaft 92 is journalled in an elongated bushing 94 mounted in the back wall 40 of the intermittence casing 36, and is provided with a flange 96 to engage the inner end of the bushing. Axial adjustment of the flywheel shaft 92 relative to the back wall 40 and bushing 94 may be effected by means of a screw 98 projecting through the member 88 fixed in the end of the flywheel 82, and threaded into the outer end of the flywheel shaft 92, suitable shims 95 being provided to permit accurate adjustment.

The internal gear 90 carried by the flywheel 82 meshes with a gear 100 fixed to a cam shaft 102. The cam shaft 102 is journalled in an elongated bushing 104 carried by the back wall 40. The bushings 94 and 104 are carried by a block 106 formed as an integral part of the back wall 40 of the casing 36. A rigid mounting having long bearing surfaces is thus provided for the shafts 92 and 102.

The intermittently driven sprocket 26 is carried by a star shaft 108 and is secured thereto by tapered pins 110. The sprocket carrying shaft 108 is preferably substantially aligned with the flywheel shaft 92, and is journalled in a bushing 112 and a bushing assembly 114.

The bushing 112 is carried in a cylindrical body member 116 interconnected with a body member 118 by an offset portion positioned outside of the periphery of the sprocket 26. The body portion 118 supports a bearing assembly 114.

Intermittently operating driving means may be interposed between the cam shaft 102 and the sprocket carrying shaft 108. One desirable form of driving means comprises a cam member 120 carried by the cam shaft 102 cooperating with a star member 122 carried by the sprocket shaft 108.

As more clearly illustrated in Fig. 4, the cam member 120 is provided with a raised circular portion 124 adapted to fit into the rounded portions 126 of the star member 122. A pin 128 carried by the cam member 120 is provided to successively engage in slots 130 formed in the star member 122 each time the cam member 120 makes a complete revolution to rotate the star member a quarter of a revolution moving the ends of the star member into the clearance space 132 between the ends of the circular portion 124 to permit rotation of the star member. Thereafter the cam surface 124 engages the rounded segments 126 of the star member thereby locking it in a fixed position.

Means may be provided to vary the adjustment of the sprocket carrying shaft 108 vertically and axially to adjust the position of the star member 122 with reference to the cam member 120, and to prevent weave of the intermittently driven sprocket 26.

An eccentric adjusting ring 134 interposed between the body member 116 and the front wall 38 of the casing 36 may be provided to move the bushing 112 and sprocket carrying shaft 108 vertically to vary the vertical adjustment of the star member 122 with reference to the cam member 120. A screw 136 may be provided to clamp the body member 116 in any adjusted position to which it is moved.

When adjusting the sprocket shaft to vary the vertical clearance between the star and cam members of the Geneva movement the body member 116 should be held from rotating to avoid changing the contacting or wearing position between the star shaft bushings 112 and 114 and the shaft 108. The body member 118 supporting the outer bearing 114 being fixed to the body member 116 by an offset arm extending outside of the sprocket 26 will be maintained in alignment with the body member 116.

The axial position of the shaft 108 and intermittently driven sprocket 26 may be adjusted by means of laminated shims 138 interposed between the body member 118 and a radially extending flange 140 carried by a sleeve 142 concentrically mounted on a sleeve bearing 143 as by a press fit therewith. Shims 138 may be progressively removed by disassembling the unit by removing screws 145 until a drag is felt to rotation of the sprocket 26. One shim may then be replaced and the assembly will have proper clearance to permit free running and to prevent lateral weaving of the sprocket 26.

The shafts, bushings and driving star and cam mechanism of the intermittence movement may be lubricated by oil supplied from a conduit 144 positioned to discharge oil into a scoop 146 carried by the back wall 40 of the intermittence casing 36. The oil flows through an aperture 148 into the interior of the intermittence mechanism to thoroughly lubricate the working parts thereof, and the oil is discharged from the casing through outlet ports 150 communicating with the mechanism compartment 14 of the projector. An adequate supply of lubricating oil is thus supplied to all of the working parts of the intermittence movement at all times that the projector is operating since oil is supplied through the conduit 144 whenever the projector is operating.

The outer bushing assembly 114 between the shaft 108 and the body member 118 may be lubricated by oil supplied through an oil cup 152 positioned in a snap cap 154 closing the outer end of the intermittently driven sprocket assembly in the film compartment 16.

The ring 50 threaded onto the cylinder 44 of the carrier and locked thereto by a screw 54 is provided with a geared segment 156 adapted to be engaged by a gear carried by a framing shaft whereby the intermittence casing 36 may be oscillated with reference to the intermediate wall 12 to rotate the intermittently driven sprocket 26 to move the film 22 to vary the alignment of film frames with reference to the aperture 24.

The driving means 84 between the driving shaft 66 and the flywheel 82 is such that the intermittently driven sprocket 26 is assembled in synchronization with the shutter operating mechanism also driven by the gearing in the gear train carrier 34. The driving means 84 may thus take the form of a four splined or flanged driving connection to permit mating of the flywheel drive with the shaft 66 in any of four positions, since the intermittence shaft 26 makes one complete revolution each time the flywheel assembly rotates four times. A two splined or flanged driving connection may also be used or the offset driving connection illustrated in Fig. 2 may be employed to permit mating of the driving members in only a single position in a complete revolution.

If desired, a vibration damper or resilient drive may be interposed in the driving connection 84 to prevent vibrations and oscillations of the intermittence movement from being exerted on the driving mechanism housed in the gear train carrier 34.

One desirable form of resilient drive includes springs 158 carried by lobes 160 carried by the shaft 66 and having rounded surfaces 162. A driving flange 164 carried by the member 88 fixed in the end flywheel 82 is adapted to project into the space between the springs 158 to transmit a resilient drive.

A self-contained intermittence movement is thus provided which may be readily removed from the projector by withdrawing the casing 36 and flywheel 82 through the cylinder 44 of the carrier mounted in the intermediate wall 12 for service or repair. The movement may then be replaced in the projector without disturbing the synchronized relation of the intermittence driving mechanism with reference to the driving gears and shutter operating mechanism. Since the shutter interrupts the projecting light, it is critical that the intermittence movement be accurately synchronized with the shutter operating mechanism.

The operation of the intermittence movement is as follows: Rotation of the shaft 32 in the gear carrier column 34 is transmitted through the gears 76 and 74 to drive the shaft 66. Rotation of the shaft 66 is transmitted through the driving means 84 to rotate the flywheel 82 and the gear 90.

Rotation of the gear 90 is transmitted through the gear 100 to rotate the cam 102 having the cam member 120 fixed thereto. Each time the cam member 120 makes a complete revolution the pin 128 engages within one of the grooves 130 of the star member to intermittently cam successively spaced radially extending portions 130 of the star member 122 into the clearance space 132 between the end portions of the raised circular portion 124 of the cam member 120. The intermittently driven sprocket 26 is thus driven a quarter of a revolution each time the cam member 120 and cam shaft 102 are rotated one complete revolution.

Variation of the drive may be effected by changing the number of lobes on the star member or varying the size of the intermittently driven sprocket 26.

A modified form of oil seal is illustrated in Fig. 6 wherein a resilient seal 180 is interposed between the front wall 38 of the intermittence movement and the cylinder 44 of the carrier. A conduit 182 is provided to drain off any oil seeping through the joint between the cylinder 42 of the front wall 38 and the cylinder 44 into a space 184 between the intermediate wall 12 and the ring 44. A seal 186 may be provided to seal the space between the intermediate wall 12 and the ring 48, and an angularly disposed port 88 may be provided to drain oil from the space 184 into the mechanism compartment 14. A set screw 195 threaded into the ring 50 engages the threads of the cylinder 44 of the carrier to maintain the parts in assembled relation. A locating dowel 197 carried by the ring 44 projects into a slot formed in the back wall 40 to maintain predetermined alignment between the intermittence movement 30 and the carrier ring 44.

A retaining flange 190 having a threaded portion 192 engaging the ring 44 may be provided with a radially inwardly directed flange 194 to overlie the front wall 38 of the intermittence mechanism as illustrated in lieu of the screws 58 to hold the intermittence movement in its carrier. A threaded plug 196 may be provided to exert a binding force on the threads to maintain the flange 190 in any adjusted position with reference to the ring 44.

This is a continuation in part of my co-pending application, Serial No. 250,310, filed January 11, 1939, now Patent Number 2,312,663, issued March 2, 1943.

I claim:

1. In a motion picture projector having a housing, a wall dividing the space within the housing into mechanism and film compartments, an intermittently driven sprocket in the film compartment, driving means in the mechanism compartment, an intermittence movement interposed between said driving means and intermittently driven sprocket comprising a carrier mounted in the intermediate wall, an intermittence casing having front and back walls, a sprocket carrying star shaft journalled in the front wall, a flywheel shaft journalled in the back wall, connecting means between the flywheel shaft and the star shaft comprising a cam shaft journalled in the back wall, a flywheel connected to the flywheel shaft and having an axially extending flange, connecting means between the flywheel shaft and the cam shaft comprising gears positioned radially inside of the flange of the flywheel, and connecting means between the casing and carrier whereby the casing and flywheel may be removed through the carrier into the film compartment.

2. In a motion picture projector having a housing, a wall dividing the space within the housing into mechanism and film compartments, an intermediate carrier journalled in the intermediate wall and comprising a flanged threaded cylinder, a ring threaded on said cylinder, yielding means between the ring and intermediate wall, an oil seal comprising vertically spaced circular seal members interconnected by an angularly disposed oil delivery duct, and an angularly directed oil delivery duct interposed between one of said seal members and the mechanism compartment.

3. In a motion picture projector, a driving shaft, an intermittence movement comprising a casing having front and back walls, a flywheel journalled in the back wall, connecting means between the driving shaft and the flywheel, a gear carried by the flywheel, an intermittently driven sprocket shaft journalled in the front wall and substantially aligned with the flywheel gear, a cam shaft journalled in the back wall and driven by the flywheel gear, cooperating cam and star intermittent driving means between the cam shaft and the intermittence sprocket shaft, and means to adjust the star member vertically with reference to the cam member comprising a cylindrical body member surrounding the intermittently driven sprocket shaft, an eccentric adjusting ring between the cylindrical body member and the front wall of the casing whereby the body member may be restrained from rotation as the eccentric ring is adjusted to avoid changing the contacting position of the intermittently driven sprocket shaft.

4. An intermittence movement for a motion picture projector comprising a casing having front and back walls, a flywheel having an axially extending flange, an internal gear positioned within said flange, the back wall of the casing having a hub extended toward the flywheel, a countershaft journalled in the hub of the back wall and having extended bearing surfaces therewith, a countershaft gear driven by the internal gear of the flywheel, an intermittence sprocket shaft, and intermittence driving means in the casing.

5. In a motion picture projector having a housing, a wall dividing the space within the housing into mechanism and film compartments, an intermittence carrier journalled in the intermediate wall and comprising a cylinder having a flange adapted to engage the film compartment side of the intermediate wall, spaced film and mechanism compartment closures for the cylinder, cam and star intermittent driving means in the cylinder between film and mechanism compartment closures, means to admit oil from the mechanism compartment to the space within the cylinder, an oil seal between the film compartment closure and the intermediate wall, and an oil duct interconnecting the space adjacent the oil seal and the mechanism compartment.

6. In a motion picture projector having a housing, a wall dividing the space within the housing into film and mechanism compartments, an intermittently driven sprocket in the film compartment to successively align spaced film frames with an aperture, a driving shaft in the mechanism compartment, an intermittence movement interposed between the driving shaft and the intermittently driven sprocket comprising a carrier including a flanged cylinder adapted to project through said wall, a ring to clamp the cylinder in the wall, yielding means between the ring and the wall to permit oscillation of the cylinder with reference to the wall, a removable and replaceable intermittence movement casing having front and back walls, connecting means between the casing and carrier whereby the casing may be removably positioned in the carrier in a predetermined position from the film compartment side, an intermittently driven shaft journalled in the front wall of the casing, connecting means between the intermittently driven sprocket and the intermittently driven shaft, a flywheel shaft journalled in the back wall of the casing, a flywheel carried by said shaft, a cam shaft journalled in the back wall of the casing, gear means interconnecting the flywheel shaft with one end of the cam shaft, cam and star intermittent driving means between the opposite end of the cam shaft and the intermittently driven shaft, a geared segment on the ring clamped to the cylinder, and means engaging the geared segment of the ring to rotate the cylinder in the wall of the housing to vary the adjusted position of spaced film frames relative to said aperture.

7. In a motion picture projector a housing having a wall dividing the space within the housing into film and mechanism compartments, an intermittence movement carrier journalled for oscillation in said wall of the housing, an intermittence casing removably positioned in the carrier in a predetermined position for removal into the film compartment and having front and back walls, a flywheel shaft journalled in the back wall, an intermittently driven shaft journalled in the front wall, a film driving sprocket fixed to the intermittently driven shaft to successively align spaced film frames with an aperture in the film compartment, a cam shaft journalled in the back wall, gear means connecting the flywheel shaft with one end of the cam shaft, cam and star intermittent driving means between the opposite end of the cam shaft and the intermittently driven shaft, a flywheel secured to the flywheel shaft, means to drive the flywheel shaft, and means to oscillate the intermittence movement carrier in said wall to vary the adjusted position of spaced film frames relative to the aperture.

RAYMOND J. MILLER.